No. 622,665. Patented Apr. 11, 1899.
C. M. BROWN.
KNOB FOR DOORS, BELLS, &c.
(Application filed Nov. 10, 1897.)

(No Model.) 3 Sheets—Sheet 1.

WITNESSES:
A. R. Strouse.
R. M. Everett

INVENTOR:
Cornelius M. Brown,
BY Drake & Co.
ATTORNEYS.

No. 622,665. Patented Apr. 11, 1899.
C. M. BROWN.
KNOB FOR DOORS, BELLS, &c.
(Application filed Nov. 10, 1897.)

(No Model.) 3 Sheets—Sheet 2.

WITNESSES: INVENTOR:
A. R. Krousse. Cornelius M. Brown,
R. M. Everett. BY Drake &Co.
ATTORNEYS.

THE NORRIS PETERS CO., PHOTO-LITHO., WASHINGTON, D. C.

No. 622,665. Patented Apr. 11, 1899.
C. M. BROWN.
KNOB FOR DOORS, BELLS, &c.
(Application filed Nov. 10, 1897.)
(No Model.) 3 Sheets—Sheet 3.

WITNESSES:
A. R. Krausse.
R. M. Everett.

INVENTOR:
Cornelius M. Brown,
BY Drake & Co.
ATTORNEYS.

UNITED STATES PATENT OFFICE.

CORNELIUS M. BROWN, OF NEWARK, NEW JERSEY, ASSIGNOR OF ONE-HALF TO GEORGE WATTS, OF PLAINFIELD, NEW JERSEY.

KNOB FOR DOORS, BELLS, &c.

SPECIFICATION forming part of Letters Patent No. 622,665, dated April 11, 1899.

Application filed November 10, 1897. Serial No. 657,995. (No model.)

*To all whom it may concern:*

Be it known that I, CORNELIUS M. BROWN, a citizen of the United States, residing at Newark, in the county of Essex and State of New Jersey, have invented certain new and useful Improvements in Knobs, Bell-Pulls, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of door-knobs represented by the one shown in my prior application, filed April 7, 1897, Serial No. 631,073, the objects of the present improvements being to secure a more neat appearing knob, one that cannot become disarranged in its operative parts when turning said knob to open the door or when otherwise manipulating the knob, to reduce the cost of construction, and to avoid the formation of recesses in the peripheral sides of the knob, such as would form a receptacle for dirt or tend to injure or render the hand uncomfortable when handling the said knob, and to secure other advantages and results, some of which may be referred to hereinafter in connection with the description of the working parts.

The invention consists in the improved knob for doors, door-bells, drawers, &c., and in the arrangements and combinations of parts of the same, all substantially as will be hereinafter set forth and finally embraced in the clauses of the claim.

Figure 1:
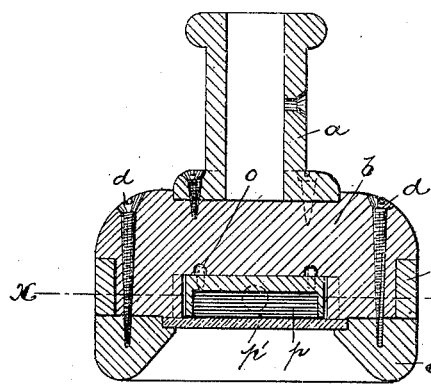
Figure 2:
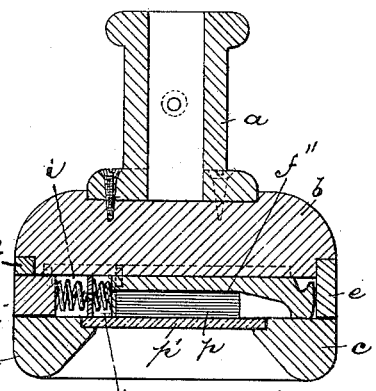
Figure 3:
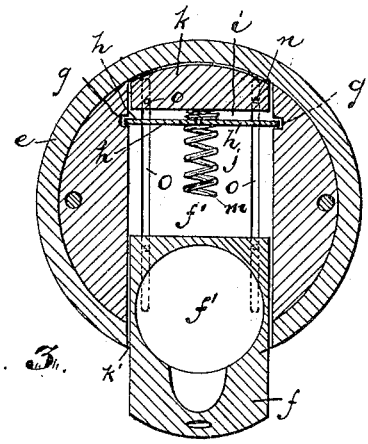
Figure 4:
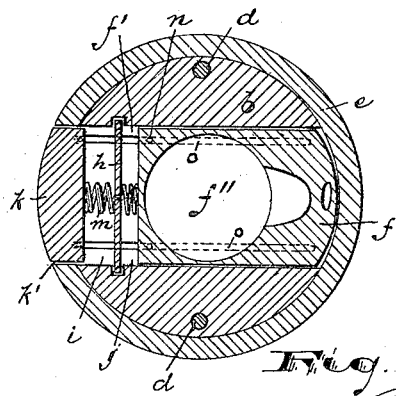
Figure 6:
Figure 7:
Figure 5:
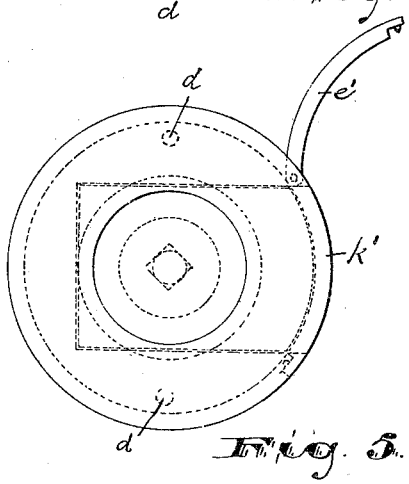
Figure 8:
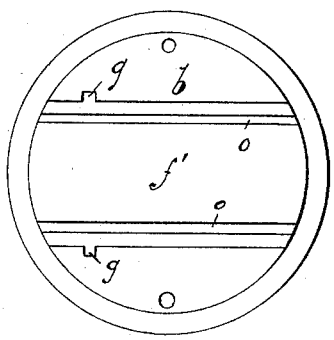
Figure 15:
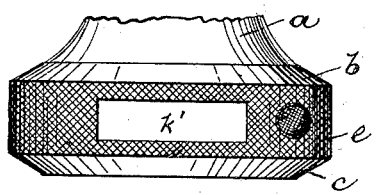
Figure 16:
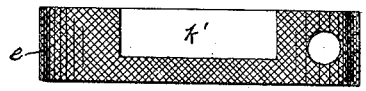
Figure 17:
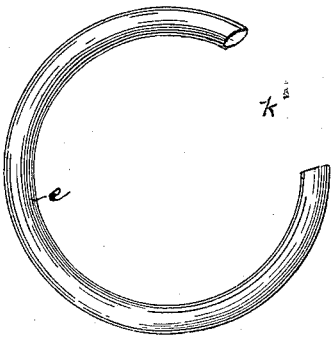
Figure 18:
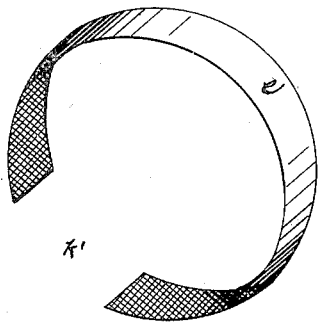

Referring to the accompanying drawings, in which like letters of reference indicate corresponding parts in each of the several views, Figure 1 is a central section of a knob of the improved construction. Fig. 2 is a similar section taken in a plane at right angles to that of Fig. 1. Fig. 3 is a section taken at line $x$, Fig. 1, showing a certain slide open. Fig. 4 is a similar section showing said slide closed. Fig. 5 is a plan of the knob, showing modifications of construction therein. Fig. 6 is a detail perspective view of a certain diaphragm providing a seat for a spring for controlling a certain sliding receptacle. Fig. 7 is a view in detail of the spring preferred. Fig. 7ª is a perspective view of a certain sliding plate. Fig. 8 is a detail plan of the knob with a certain outer section removed. Figs. 9, 10, 11, 12, 13, and 14 are sectional views of the knob, illustrating variations of construction of the working parts, all of which will be duly explained. Fig. 15 is a side view of the knob, showing a locking device adapted to prevent the band from turning; and Fig. 16 is a side view of a similar band detached from the knob, showing the sliding-aperture and locking means. Figs. 17 and 18 illustrate variations in the construction of the band.

In said drawings, $a$ indicates the shank of the knob, which may be of any ordinary construction adapted to secure the knob in position. $b$ is the body-section of the handpiece, to which the said shank is preferably secured by screws or in any other manner, and $c$ is an outer section adapted to be fastened to the outer face of the body-section by means of screws $d\,d$ or other fastening means. The body-section is centrally recessed or apertured in its outer face to form a slide chamber or receptacle for cards or plates containing advertising matter, imprints, pictures, or other devices, and at its periphery said body portion is circumferentially grooved to receive a band $e$, the said groove being bounded at the outer side of the said body portion by the outer section $c$.

The aperture or recess $f'$ in the face of the body portion preferably extends transversely across the face of the said section from one side of the knob to the other, the said transverse recess opening outward into the annular groove, as indicated in Figs. 3 and 4, and in the preferred construction the said transverse recess corresponds in width with an opening formed in the band.

Within the transverse aperture or recess $f'$ is arranged a sliding plate or advertising-card receptacle $f$, which may be of various constructions, as indicated in Figs. 3, 4, 7ª, 13, and 14. Said sliding receptacle may be composed of cast or sheet metal or of bent wire, as in Fig. 13, or an assemblage of wires, as in Fig. 14, or of any other suitable material. I prefer, however, at the present time to construct the receptacle of cast metal. Near one end of the said transverse recess or aperture $f'$ are formed, at opposite sides thereof, small recesses $g\ g$ in the side walls thereof, adapted to receive the opposite ends of a diaphragm $h$. Said diaphragm $h$ is removably placed with more or less firmness in said recesses $g\ g$, so as to divide the aperture $f'$ into apartments or chambers $i$ and $j$, preferably of unequal sizes, the smaller chamber being adapted to receive a locking-slide $k$ and the larger chamber the sliding plate or receptacle $f$. The diaphragm $h$ is perforated at its center, as clearly illustrated in Fig. 6, with a spring-passage $l$, through which the spring $m$ may extend, which spring at opposite sides of the said diaphragm is adapted to bear oppositely from the opposite sides of the said diaphragm against the slides $k$ and $f$ and normally tend to throw said slides outwardly toward the periphery of the knob. The outward movements of the said slides are limited, preferably, by means of limiting-pins $n$, which work in grooves $o$, formed in the body-section of the knob. These grooves may be made at any point within the knob convenient, or said grooves and pins may in some cases be dispensed with and other means for limiting the outward movements of the slides be employed, as in Fig. 9, where the locking-slide is limited in its outward movement by engaging the inclined end walls of the slot or plate-passage in the band. The said band $e$ in the preferred construction encircles the peripheral edges of the knob, lying in the groove formed by the sections. Said band is preferably continuous, being provided at one side with a slot or opening of about the width and thickness of the slide $f$ and locking-slide $k$, said slot $k'$ being formed so as to be brought into coincidence with the groove or slideway in the body-section, and thus adapted to receive the said slides when the said band is turned into such coincidence, the slides entering the slot automatically or by the mechanical action of the springs. When thus forced out into the slot of the band, the locking-slide is limited in its movement, so that its outer curved edge is brought flush with the outer surface of the band to effect a finished and smooth outer periphery to the knob, preventing the formation of a more or less deep recess, which would tend to render the knob somewhat uncomfortable in turning the same. The slide $f$ is permitted to project considerably beyond the outer face of the band, so as to expose the chamber $f'''$ thereof to permit the insertion of advertising cards or plates $p$, Figs. 1 and 2, or the interchange thereof. This chamber $f'''$ may in some cases be dispensed with, and in place of the sliding receptacle $f$ a sliding plate F, Fig. 7$^a$, may be used. In this event the inscription or other devices may be on the face of the plate F and said plate adapted to be withdrawn from the slideway and reversed. This sliding plate F may, furthermore, be made of slate or similar material adapted to be written on and readily cleansed to receive a different inscription.

While it is not an essential part of the invention, I prefer to employ a glass face-plate $p'$ to hold the advertisements in place within the chamber $f'''$. This plate $p'$ has suitable bearings between the sections $b\ c$ of the handle and may have at one or both sides suitable washers to secure a tight and firm holding of said plate $p'$ without breaking the same.

Figure 9:
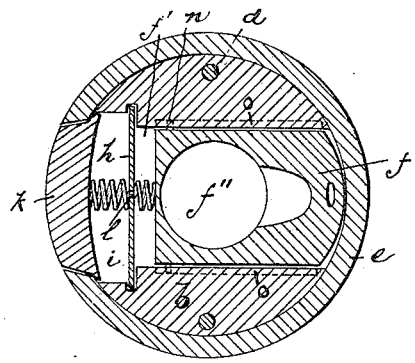
Figure 10:
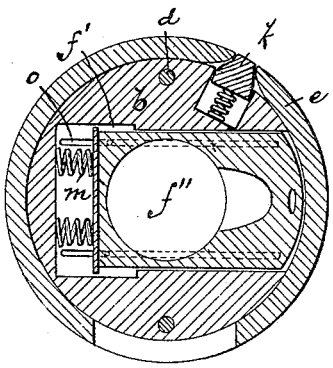

In Fig. 9 I show a modification of construction in which the sliding locking-plate $k$ is limited in its outer movements by the end walls of the band, slot, or opening $k'$, and in this event I make the sliding receptacle $f$ for the advertising-cards somewhat narrower than the locking-slide $k$. In this variation I also show the limiting-pins and grooves at the longitudinal edges of the plate $f$, which modification might equally well be applied to the locking-slide $k$.

Figure 11:
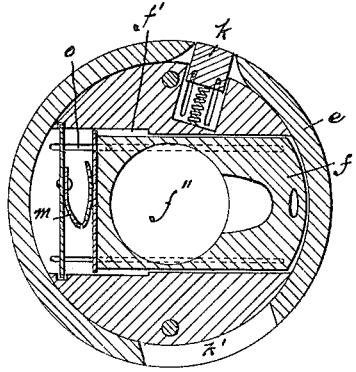
Figures 7A, 12:
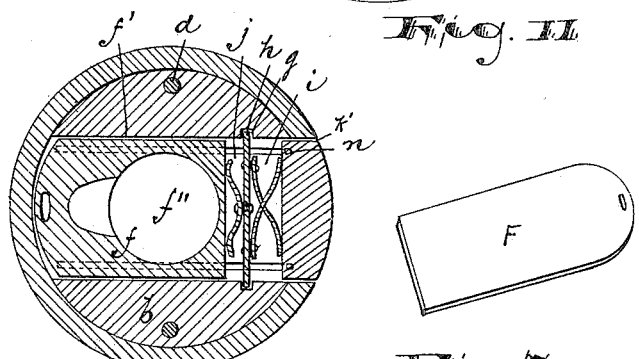

In Figs. 10, 11, 15, and 16 I show a construction in which the locking-plates more closely resemble an ordinary push-button, the same being made considerably smaller and arranged in connection with an independent opening in the band and an independent receptacle therefor in the body-section. In this case I show two springs for operating the sliding card-receptacle. In Fig. 11 I show another variation in which I employ another kind of spring, and in Fig. 12 other variations in the arrangements and forms of the springs are shown.

Figure 13:
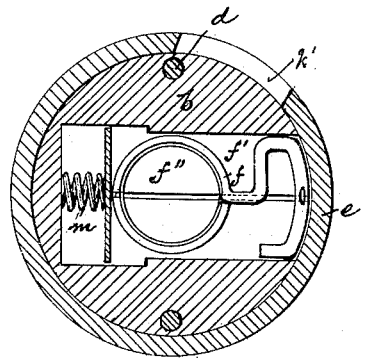
Figure 14:
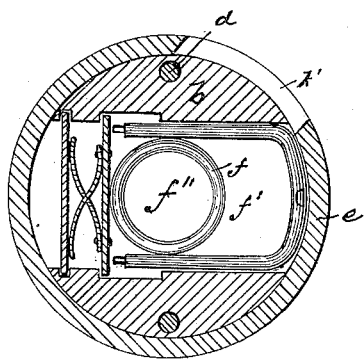

In Fig. 13 I show a variation in the construction of the card-receptacle, the same being made of bent wire. In this case it may be observed that the chamber $f'''$ is bottomless so far as the slide is concerned, this formation permitting of relatively more space for the cards and a more easy withdrawal of the card, the fingers being permitted to operate from the rear as well as from the front. The formation of the band may also be varied to suit various conditions. In Fig. 17, for example, the band is simply a piece of heavy wire, the ends of which form the slot or opening, and in Fig. 18 the band is made of sheet metal. In these cases the resiliency of the metal serves in holding the said bands firmly and securely in place within the peripheral groove of the knob.

In Fig. 5 I show a simplified form of my invention in which the transverse recess or aperture does not extend entirely across the knob, but only sufficiently far to contain the sliding plate or receptacle. Said plate or receptacle having been placed therein is held from slipping out by a band $e'$, pivoted at one end and adapted to cover the slot in the side of the knob and be locked in position by a suitable catch.

It will thus be seen that I can vary the construction of my invention very considerably without departing from the spirit or scope of the invention, and consequently I do not wish to be understood as limiting myself by the positive terms employed in the foregoing description, excepting as the state of the art may require.

Having thus described the invention, what I claim as new is—

1. The combination with the knob, of a sliding advertising-receptacle, and a locking-plate, arranged within said knob, and a peripheral band arranged around the knob to hold said advertising-receptacle in place, the said band being locked by said locking-plate to prevent the turning of the band when turning the knob, substantially as set forth.

2. The combination of the sectional handle, band e, locking-plate k, receptacle f, diaphragm h, and spring m, all arranged and combined, substantially as set forth.

3. The combination with the knob, having a transverse groove or slideway therein, of a diaphragm h, locking-plate k, advertising-receptacle f, and band e, all arranged and combined, substantially as set forth.

4. The improved knob, comprising sections b, c having a transverse groove or slideway between, openings at opposite sides of the knob, a diaphragm, having a central passage for a spring, said spring, having bearings on said diaphragm, a locking-plate and a receptacle, and means for closing the end of the slideway to conceal the same, substantially as set forth.

5. The improved knob, comprising sections b, c, open at the front and having a transverse slideway opening at one side of the knob, a sliding receptacle arranged in said slideway and having a chamber adapted to coincide with the front opening, a band for holding said receptacle in place, and a locking device for preventing said band from turning, substantially as set forth.

6. The improved knob, comprising a shank, a sectional handpiece, the section b, of which is secured to the shank a, and the section c, being of annular form with an open front and removably fastened to the section b, a sliding receptacle arranged between the sections b, c, having a limited outward movement in the slideway, and a band adapted to be turned over the end of said slide to hold the chamber therein in coincidence with the opening in the said front section, and means for locking said band, substantially as set forth.

7. The improved knob, comprising a shank, a sectional handpiece, the section b, of which is secured to the shank, and the section c, being provided with an open front, a receptacle arranged between said sections and having a chamber adapted to coincide with the said open front, a band e, and lock k, all arranged and combined, substantially as set forth.

8. The improved knob comprising a shank, a sectional handpiece, the sections of which are provided with a slideway, open at opposite ends, for a card-receptacle, plates f and k, arranged to slide in said slideway, an interposed spring pressing oppositely against said plates, and a band having an opening $k'$, adapted to be brought into coincidence with the slideway to permit the out-passage of the said plates f and k, substantially as set forth.

9. The improved knob, comprising a shank, a handpiece having, interiorly, a card-receptacle with means permitting the withdrawal of said receptacle and exposure of a card-chamber therein, a band and a lock holding the said band in position on said knob to prevent the withdrawal of said receptacle, substantially as set forth.

10. The improved knob comprising a shank, a handpiece having an interior card-receptacle, a band having an opening $k'$, a plate k, having a limited outward movement impelled by a spring, and said spring, the said plate k, being within the opening $k'$, flush with the outer periphery of the band, substantially as set forth.

In testimony that I claim the foregoing I have hereunto set my hand this 5th day of November, 1897.

CORNELIUS M. BROWN.

Witnesses:
CHARLES H. PELL,
R. M. EVERETT.